(12) United States Patent
Liang et al.

(10) Patent No.: US 9,182,834 B2
(45) Date of Patent: *Nov. 10, 2015

(54) MOUSE DEVICE

(75) Inventors: Chia Cheun Liang, Hsin-Chu (TW); Hsiang Sheng Liu, Hsin-Chu (TW); Yu Han Chen, Hsin-Chu (TW); Chien Jung Huang, Hsin-Chu (TW); Chih Chung Tsai, Hsin-Chu (TW); Chih Yen Wu, Hsin-Chu (TW); Ming Tsan Kao, Hsin-Chu (TW)

(73) Assignee: PIXART IMAGING INC, Hsin-Chu (TW)

( * ) Notice: Subject to any disclaimer, the term of this patent is extended or adjusted under 35 U.S.C. 154(b) by 155 days.

This patent is subject to a terminal disclaimer.

(21) Appl. No.: 13/587,007

(22) Filed: Aug. 16, 2012

(65) Prior Publication Data

US 2013/0057473 A1 Mar. 7, 2013

(30) Foreign Application Priority Data

Sep. 2, 2011 (TW) .............................. 100131651 A

(51) Int. Cl.
*G06F 3/02* (2006.01)
*G06F 3/03* (2006.01)
*G06F 3/038* (2013.01)
*G06F 3/0354* (2013.01)

(52) U.S. Cl.
CPC .............. *G06F 3/03543* (2013.01); *G06F 3/02* (2013.01); *G06F 3/038* (2013.01); *G06F 3/0308* (2013.01)

(58) Field of Classification Search
CPC ....... G06F 3/02; G06F 3/0202; G06F 3/0234; G06F 3/03; G06F 3/0304; G06F 3/033; G06F 3/0334; G06F 3/03543; G06F 3/03544
USPC .................................................. 345/156–172
See application file for complete search history.

(56) References Cited

U.S. PATENT DOCUMENTS

| | | | | |
|---|---|---|---|---|
| 4,015,254 A * | 3/1977 | Strandt | ............................ | 341/22 |
| 4,205,575 A * | 6/1980 | Hoskinson et al. | ............. | 84/607 |
| 4,963,858 A * | 10/1990 | Chien | ........................... | 345/157 |
| 5,805,142 A * | 9/1998 | Byrne | ........................... | 345/163 |
| 5,831,597 A * | 11/1998 | West et al. | ..................... | 345/163 |
| 5,847,694 A * | 12/1998 | Redford et al. | ............... | 345/158 |
| 6,353,432 B1 | 3/2002 | Chiu et al. | | |
| 6,437,547 B2 | 8/2002 | Petricek et al. | | |
| 7,627,128 B2 | 12/2009 | Sander et al. | | |
| 8,138,811 B2 | 3/2012 | Liao et al. | | |
| 8,564,335 B1 * | 10/2013 | Weiser | ........................... | 327/112 |
| 2001/0024192 A1 * | 9/2001 | Lewis | ............................ | 345/163 |
| 2002/0035701 A1 * | 3/2002 | Casebolt et al. | ............. | 713/300 |
| 2002/0075233 A1 * | 6/2002 | White et al. | ................... | 345/161 |
| 2005/0219231 A1 * | 10/2005 | Silverbrook et al. | ......... | 345/173 |
| 2006/0038783 A1 * | 2/2006 | Shaw et al. | ................... | 345/163 |
| 2006/0232559 A1 * | 10/2006 | Chien et al. | ................... | 345/168 |
| 2008/0119151 A1 * | 5/2008 | Hsieh et al. | ................... | 455/230 |
| 2009/0146044 A1 * | 6/2009 | Chen et al. | ................. | 250/201.1 |
| 2009/0146940 A1 * | 6/2009 | Kang et al. | ..................... | 345/100 |

(Continued)

*Primary Examiner* — Dwayne Bost
*Assistant Examiner* — Stefan M Oehrlein
(74) *Attorney, Agent, or Firm* — Hauptman Ham, LLP

(57) ABSTRACT

There is provided a mouse device including a control chip and at least one control component. The control chip includes a voltage detection circuit coupled to the at least one control component through at least one multiplexing pin and detects at least one voltage value on the at least one multiplexing pin using the voltage detection circuit thereby identifying an operating state of the at least one control component.

18 Claims, 9 Drawing Sheets

(56) References Cited

U.S. PATENT DOCUMENTS

| | | | |
|---|---|---|---|
| 2011/0074613 A1* | 3/2011 | Newman | 341/143 |
| 2011/0148765 A1* | 6/2011 | Chuang et al. | 345/166 |
| 2012/0229163 A1* | 9/2012 | Jansen et al. | 326/38 |
| 2013/0050083 A1* | 2/2013 | Chen et al. | 345/163 |

* cited by examiner

| $S_L$ | $B_R$ | $B_L$ | $V_{in}$ | $S_H$ | $B_R$ | $V_{in}$ |
|---|---|---|---|---|---|---|
| ON | OFF | ON | $\dfrac{R'V_d}{R+R'}$ | ON | ON | $\dfrac{RV_{DD}}{R+R'}$ |
| ON | OFF | OFF | 0 | ON | OFF | $V_{DD}$ |
| ON | ON | ON | $\dfrac{(R//R')V_d}{R+(R//R')}$ | | | |

| 1st detection state SL ON | 2nd detection state SH ON | 3rd detection state SL&SH OFF | 1:ON , 0:OFF | |
|---|---|---|---|---|
| $V_{in}$ | $V_{in}$ | $V_{in}$ | Z1 | $B_L$ |
| $V_{DD}/2$ | $V_{DD}$ | $V_{DD}$ | 0 | 1 |
| $V_{DD}/3$ | $2V_{DD}/3$ | $V_{DD}/2$ | 1 | 1 |
| GND | $V_{DD}/2$ | GND | 1 | 0 |
| GND | $V_{DD}$ | X | 0 | 0 |

| sleep mode $S_L$ ON | 1:ON , 0:OFF | |
|---|---|---|
| $V_{in}$ | Z1 | $B_L$ |
| $V_{DD}$ | 0 | 1 |
| $V_{DD}/3$ | 1 | 1 |
| GND | 1 | 0 |
| GND | 0 | 0 |

| 1st detection state | 2nd detection state | 3rd detection state | 4th detection state |
|---|---|---|---|
| $S_{ML}$ ON(LED OFF) $S_{MH},S_{LH},S_{LL}$ OFF | $S_{LH}$ ON(LED OFF) $S_{MH},S_{ML},S_{LL}$ OFF | $S_{MH}$ ON $S_{ML}$ OFF | $S_{ML},S_{LL}$ ON $S_{MH},S_{LH}$ OFF |
| $V_{in}$ reflects the operating state of multiplexer 21 | $V_{in}'$ reflects the operating state of multiplexer 22 | $S_{LL}$ ON→LED ON $S_{LH}$ ON→LED OFF | $V_{in}$ or $V_{in}'=V_{DD}$ ends sleep mode |

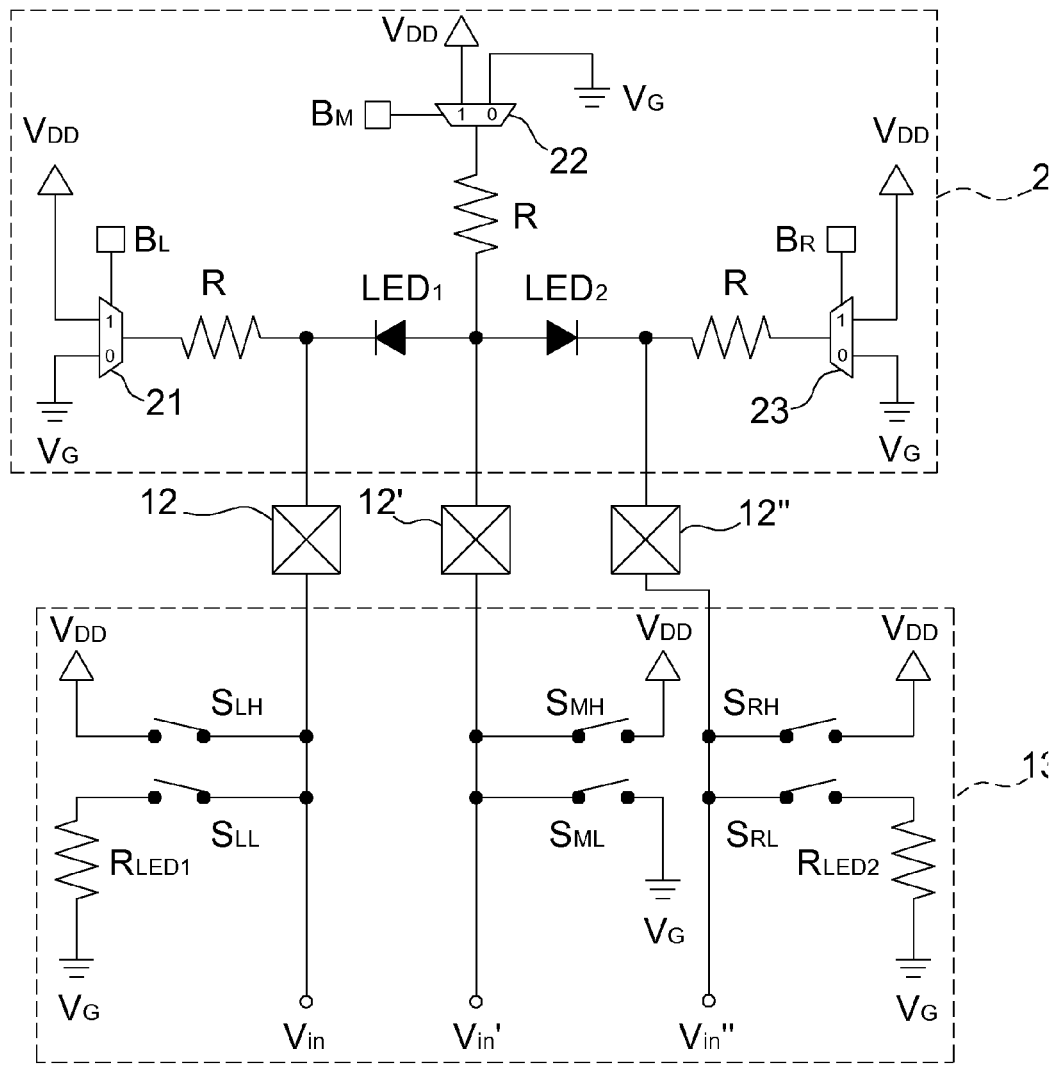

FIG. 8A

| 1st detection state | 2nd detection state | 3rd detection state | 4th detection state |
|---|---|---|---|
| $S_{ML}$ ON(LED OFF) others OFF | $S_{LH}$ ON(LED$_1$ OFF) $S_{RH}$ ON(LED$_2$ OFF) others OFF | $S_{MH}$ ON $S_{ML}$ OFF | $S_{RL}, S_{ML}, S_{LL}$ ON $S_{RH}, S_{MH}, S_{LH}$ OFF |
| $V_{in}$ reflects the operating state of 21 $V_{in}"$ reflects the operating state of 23 | $V_{in}'$ reflects the operating state of 22 | $S_{LL}$ ON→LED$_1$ ON $S_{LH}$ ON→LED$_1$ OFF $S_{RL}$ ON→LED$_2$ ON $S_{RH}$ ON→LED$_2$ OFF | $V_{in} \sim V_{in}"=V_{DD}$ ends sleep mode |

FIG. 8B

MOUSE DEVICE

CROSS REFERENCE TO RELATED APPLICATION

This application claims the priority benefit of Taiwan Patent Application Serial Number 100131651, filed on Sep. 2, 2011, the full disclosure of which is incorporated herein by reference.

BACKGROUND

1. Field of the Disclosure

This disclosure generally relates to a mouse device and, more particularly, to a mouse device that may detect a voltage value on at least one multiplexing pin of a control chip to accordingly identify an operating state of at least one control component.

2. Description of the Related Art

A mouse device generally includes a plurality of control components so as to satisfy various requirements. For example, the mouse device may include a plurality of mouse keys, a mouse roller and a light emitting diode corresponding to respective operating states. Therefore, a mouse device general includes a mouse chip configured to detect different operating states to accordingly control an operation of an electronic device coupled thereto.

In order to detect the different operating states, the control chip of conventional mouse devices generally has a plurality of pins configured to detect different trigger states of different control components. For example, FIG. 1 shows a conventional mouse chip 9 including a pin L, a pin M and a pin R respectively configured to detect the pressing state of the mouse left key, middle key and right key. However, more pins can increase the manufacturing cost of the mouse device. But if the pin number is limited in order to reduce the manufacturing cost, the operating functions of the mouse device will be limited.

Accordingly, the present disclosure provides a mouse device that detects a voltage value on at least one multiplexing pin of a control chip to accordingly identify an operating state of at least one control component thereby reducing the pin number of the control chip and maintaining enough operating functions.

SUMMARY

It is an object of the present disclosure to provide a mouse device in which a plurality of control components may share one multiplexing pin of the control chip thereof.

It is another object of the present disclosure to provide a mouse device that may detect a voltage value on at least one multiplexing pin of a control chip to accordingly identify an operating state of at least one control component.

The present disclosure provides a mouse device including a control chip and a multiplexer. The control chip includes a multiplexing pin and a voltage detection circuit, wherein the voltage detection circuit is configured to detect a voltage value on the multiplexing pin. The multiplexer has a first multiplexed input and a second multiplexed input and is configured to couple the multiplexing pin to the first multiplexed input or the second multiplexed input according to an operating state of a mouse key thereby outputting different voltage values.

The present disclosure further provides a mouse device including a control chip and an external circuitry. The control chip includes at least one multiplexing pin, an internal circuitry and a voltage detection circuit. The internal circuitry is coupled to the at least one multiplexing pin and outputs at least one voltage value. The voltage detection circuit is configured to detect the at least one voltage value. The external circuitry includes a plurality of control components and is coupled to the at least one multiplexing pin, wherein the control chip controls different detection states of the internal circuitry to allow the voltage detection circuit to detect the at least one voltage value thereby identifying an operating state of the control components of the external circuitry according to the at least one voltage value detected.

The present disclosure further provides a mouse device including a control chip and an external circuitry. The control chip includes a plurality of multiplexing pins, an internal circuitry and a voltage detection circuit. The internal circuitry is coupled to the multiplexing pins and outputs a plurality of voltage values. The voltage detection circuit is configured to detect the voltage values. The external circuitry is coupled to the multiplexing pins and includes a plurality of control components and at least one LED coupled to between two of the multiplexing pins, and each of the control components being associated with one of the multiplexing pins, wherein the control chip controls different detection states of the internal circuitry to allow the voltage detection circuit to detect the voltage values thereby identifying an operating state of each of the control components according to the voltage values detected and to control an operating state of the at least one LED.

In the mouse device of the present disclosure, the control components may be mouse keys, mouse encoders or a combination thereof. The voltage detection circuit may be a comparator or an analog-to-digital converter.

BRIEF DESCRIPTION OF THE DRAWINGS

Other objects, advantages, and novel features of the present disclosure will become more apparent from the following detailed description when taken in conjunction with the accompanying drawings.

FIG. 8A shows a circuit diagram of another application of the mouse device according to the second embodiment of the present disclosure.

FIG. 8B shows an operational schematic diagram of the application of the mouse device shown in FIG. 8A.

DETAILED DESCRIPTION OF THE EMBODIMENT

It should be noted that, wherever possible, the same reference numbers will be used throughout the drawings to refer to the same or like parts.

Figure 1:
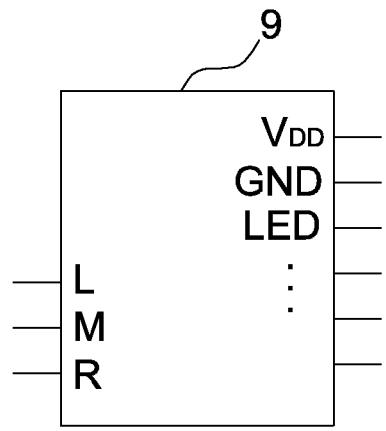
FIG. 1 shows a schematic block diagram of a conventional mouse chip.
Figure 2:
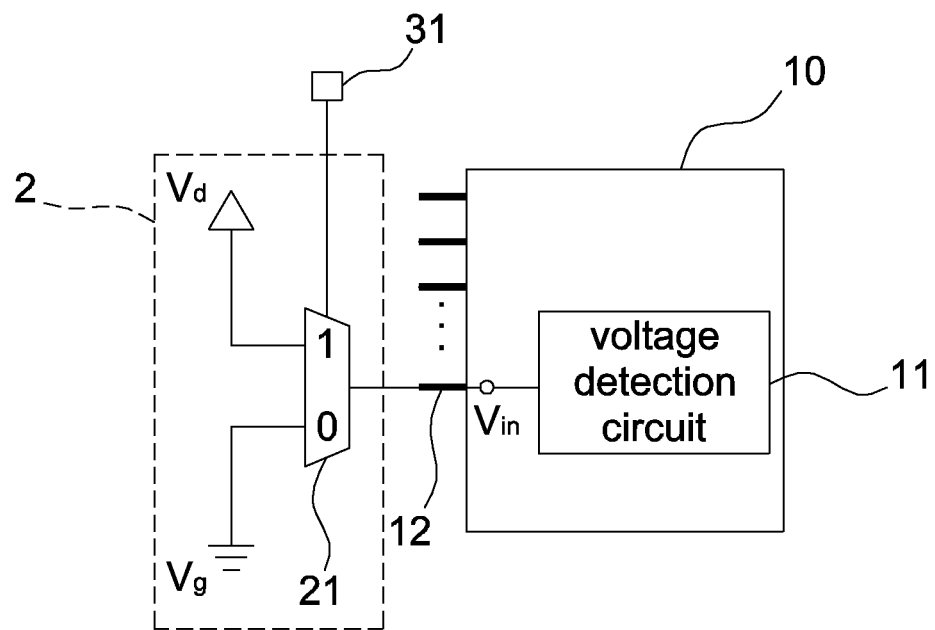
FIG. 2 shows a schematic block diagram of the mouse device according to the first embodiment of the present disclosure.

Please refer to FIG. 2, it shows a schematic block diagram of the mouse device according to the first embodiment of the present disclosure. The mouse device includes a control chip 10 and an external circuitry 2. The control chip 10 includes a voltage detection circuit 11 and a multiplexing pin 12, wherein the voltage detection circuit 11 is configured to detect a voltage value on the multiplexing pin 12 so as to identify an operating state of a control component. The external circuitry 2 includes a multiplexer 21 and two voltage sources Vd and Vg, wherein the multiplexer 21 may be a mechanical multiplexer which is under control of a control component 31 (e.g. a mouse key) to couple the multiplexing pin 12 to a first voltage source Vd or a second voltage source Vg. A voltage value of the first voltage source Vd is different from that of the second voltage source Vg, and the second voltage source Vg may be a ground voltage (e.g. substantially equal to 0 volt), but not limited thereto. In one embodiment, the control component 31 may be included inside the external circuitry 2.

In this manner, when the control component 31 controls a multiplexed input "1" to conduct (e.g. the mouse key is pressed), the voltage detection circuit 11 may detect the voltage value Vin on the multiplexing pin 12 being substantially equal to the first voltage source Vd. When the control component 31 controls a multiplexed input "0" to conduct (e.g. the mouse key is not pressed), the voltage detection circuit 11 may detect the voltage value Vin on the multiplexing pin 12 being substantially equal to the second voltage source Vg. The control chip 10 then may identify different operating states of the control component 31 according to different voltage values Vin detected by the voltage detection circuit 11. In addition, as long as different voltage values can be formed on the multiplexing pin 12 corresponding to the different operating states of the control component 31, the first voltage source Vd or the second voltage source Vg in FIG. 2 may be floated. In one embodiment, the voltage detection circuit 11 may be a comparator or an analog-to-digital converter.

Since no current is consumed in any operating state of the control component 31, this embodiment has the merit of saving energy. The control chip 10 may identify an operating state of a mouse key according to a voltage value Vin detected by the voltage detection circuit 11.

Figure 3:
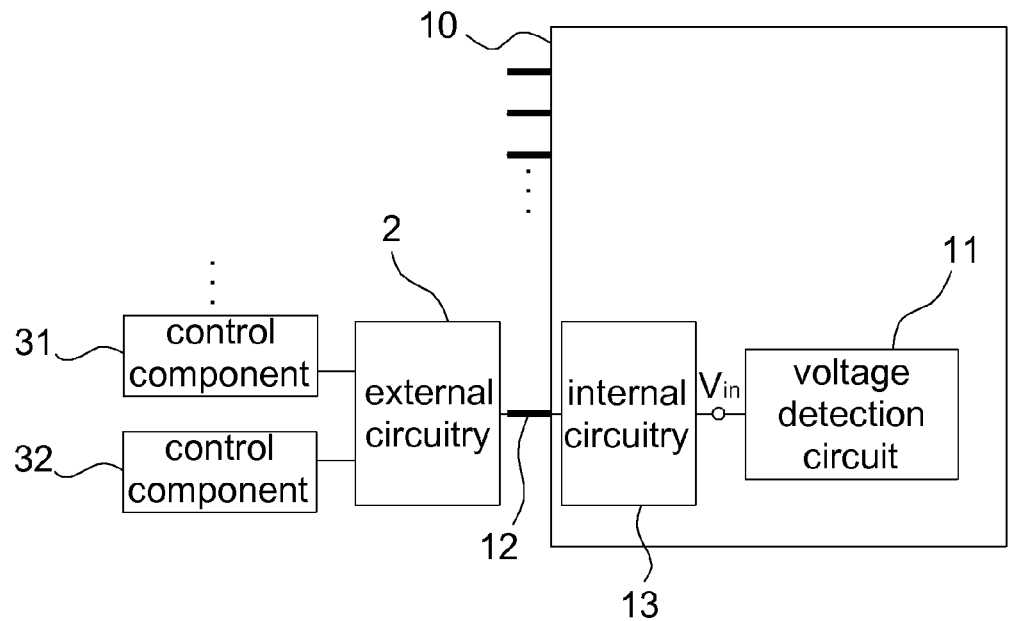
FIG. 3 shows a schematic block diagram of the mouse device according to the second embodiment of the present disclosure.

Please refer to FIG. 3, it shows a schematic block diagram of the mouse device according to the second embodiment of the present disclosure. The mouse device includes a control chip 10, an external circuitry 2 and a plurality of control components 31, 32, . . . . The control chip 10 includes a voltage detection circuit 11, at least one multiplexing pin 12 and an internal circuitry 13. The voltage detection circuit 11 is configured to detect at least one voltage value Vin and controls an operation of an electronic device coupled to the mouse device according to the at least one voltage value Vin, wherein said operation may be those controlled by conventional mouse devices. The internal circuitry 13 is coupled to the at least one multiplexing pin 12 and outputs the at least one voltage value Vin. The external circuitry 2 is coupled to between the control components 31, 32, . . . and the at least one multiplexing pin 12, wherein the at least one voltage value Vin is determined according to different operating states of the control components of the external circuitry 2 and different detection states of the internal circuitry 13. That is, the control chip 10 may control the internal circuitry 13 to operate in different detection states to allow the voltage detection circuit 11 to detect at least one voltage value Vin and may accordingly identify an operating state of the control components of the external circuitry 2. The control components may be mouse keys, mouse rollers (or mouse encoders), light emitting diodes (LED) or combinations thereof, wherein the LED may be served as a light source for the mouse device capturing images or served as a light source for an optical encoder, but not limited thereto. In one embodiment, the control components 31, 32, . . . may be included inside the external circuitry 2.

Figure 4A:
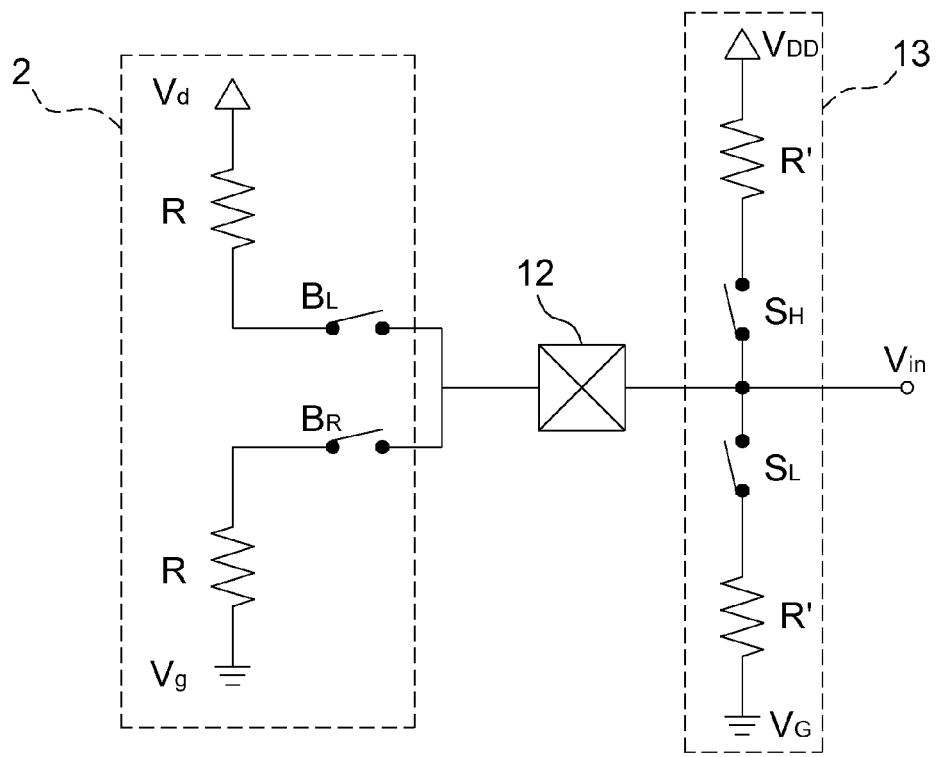
FIG. 4A shows a circuit diagram of the external circuitry and the internal circuitry of the mouse device according to the second embodiment of the present disclosure.
Figures 4B, 4C:
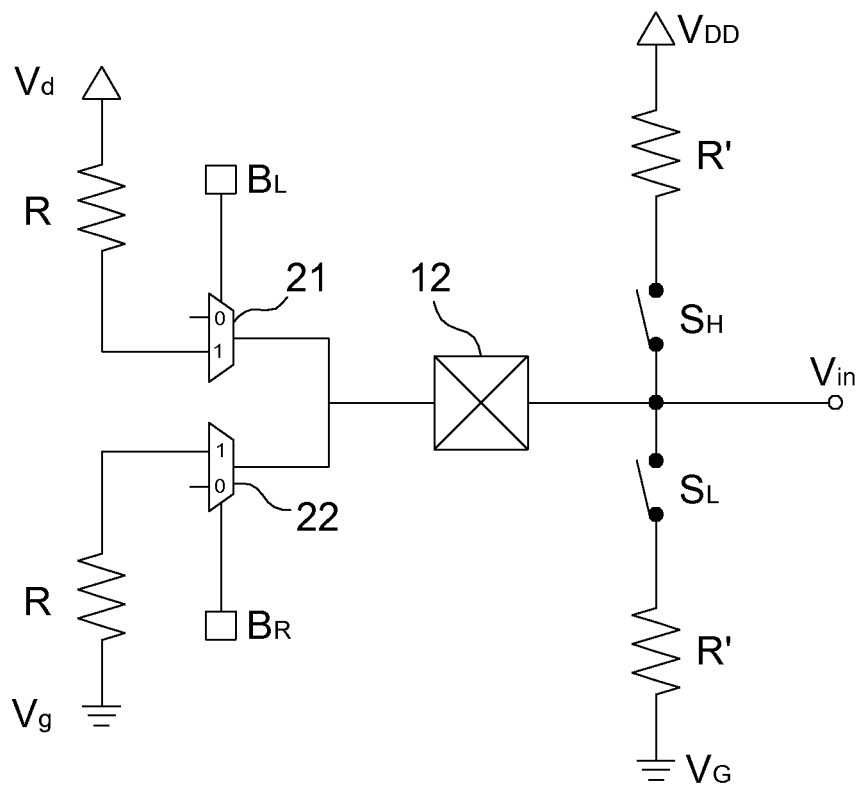
FIG. 4B shows an operational schematic diagram of the mouse device shown in FIG. 4A.
FIG. 4C shows another circuit diagram of the mouse device in FIG. 4A.

Please refer to FIGS. 4A and 4B, FIG. 4A shows a circuit diagram of the external circuitry 2 and the internal circuitry 13 of the mouse device according to the second embodiment of the present disclosure, and FIG. 4B shows an operational schematic diagram of the mouse device shown in FIG. 4A.

The external circuitry 2 includes two switching components $B_L$, $B_R$ and two first resistors R having identical resistances. The switching components $B_L$ and $B_R$ may be respectively controlled by a left key and a right key of the mouse device, e.g. when the left key of the mouse device is pressed, the switching component $B_L$ conducts to couple the multiplexing pin 12 to a first voltage source Vd via one of the first resistors R; and when the right key of the mouse device is pressed, the switching component $B_R$ conducts to couple the multiplexing pint 12 to a second voltage source Vg via the other one of the first resistors R. It should be mentioned that the relation between the ON/OFF of the switching components $B_L$, $B_R$ and the pressing state of the mouse keys is only exemplary herein.

The internal circuitry 13 includes a first control switch $S_H$, a second control switch $S_L$ and two second resistors R' having identical resistances. The control chip 10 controls the ON/OFF of the control switches $S_H$ and $S_L$ within one detection interval (e.g. a time interval in which the mouse device is not capturing images) in a sequential of, e.g. $(S_H,S_L)$=(ON, OFF) and $(S_H,S_L)$=(OFF,ON). When the first control switch $S_H$ conducts, the multiplexing pin 12 is coupled to a third voltage source $V_{DD}$ via one of the second resistors R'; on the other hand, when the second control switch $S_L$ conducts, the multiplexing pin 12 is coupled to a fourth voltage source $V_G$ via the other one of the second resistors R', wherein the fourth voltage source $V_G$ may be a ground voltage (e.g. substantially equal to 0 volt). In one embodiment, the resistance of the first resistors R is substantially equal to that of the second resistors R'; the first voltage source Vd is equal to the third voltage source $V_{DD}$; and the second voltage source $V_G$ and the fourth voltage source $V_G$ are substantially equal to 0 volt. In one embodiment, the first control switch $S_H$ and the second control switch $S_L$ are CMOS switches.

As shown in FIG. 4B, in the time interval that the control chip 10 controls the second control switch $S_L$ to conduct (ON), different voltage values Vin on the multiplexing pin 12 can be detected corresponding to the ON/OFF of the switching components $B_L$ and $B_R$. For example, when $B_L$ is ON and $B_R$ is OFF, the voltage value Vin is equal to $R' \times Vd/(R+R')$; when both $B_L$ and $B_R$ are ON, the voltage value Vin is equal to $(R//R') \times Vd/[R+(R//R')]$; and when both $B_L$ and $B_R$ are OFF, the voltage value Vin is equal to 0, wherein $(R//R')$ denotes a parallel equivalent resistance of the resistors R and R'. That is, when the second control switch $S_L$ conducts, the switching component $B_L$ is ON as long as the voltage value Vin is not equal to 0, and the ON/OFF of the switching component $B_R$ is determined by the voltage value Vin. In the interval that the control chip 10 controls the first control switch $S_H$ to conduct (ON), different voltage values Vin on the multiplexing pin 12 can be detected corresponding to the ON/OFF of the switching component $B_R$. It is known from FIG. 4B that each detection state of the internal circuitry 13 is associated with one voltage value Vin and thus it is able to identify the operating state of the switching components $B_L$ and $B_R$ according to the voltage value Vin detected.

In anther embodiment, the switching component $B_L$ may be replaced by a first multiplexer 21 and the switching component $B_R$ may be replaced by a second multiplexer 22 (FIG. 4C), wherein the first multiplexer 21 is under control of a control component (e.g. the mouse key $B_L$) and the second multiplexer 22 is under control of another control component (e.g. the mouse key $B_R$). When the mouse key $B_L$ is pressed, the multiplexing pin 12 is coupled to the first voltage source Vd via one of the first resistors R; when the mouse key $B_L$ is not pressed, the multiplexing pin 12 is floating; when the mouse key $B_R$ is pressed, the multiplexing pin 12 is coupled to the second voltage source Vg via the other one of the first resistors R; and when the mouse key $B_R$ is not pressed, the multiplexing pin 12 is floating. In this embodiment, voltage values Vin corresponding to conducting states of the multiplexers 21 and 22 are similar to those shown in FIG. 4B, and thus details thereof will not be repeated herein.

In this embodiment, the control chip 10 may identify an operating state of two mouse keys according to a voltage value Vin detected by the voltage detection circuit 11.

Figures 5A, 5B:
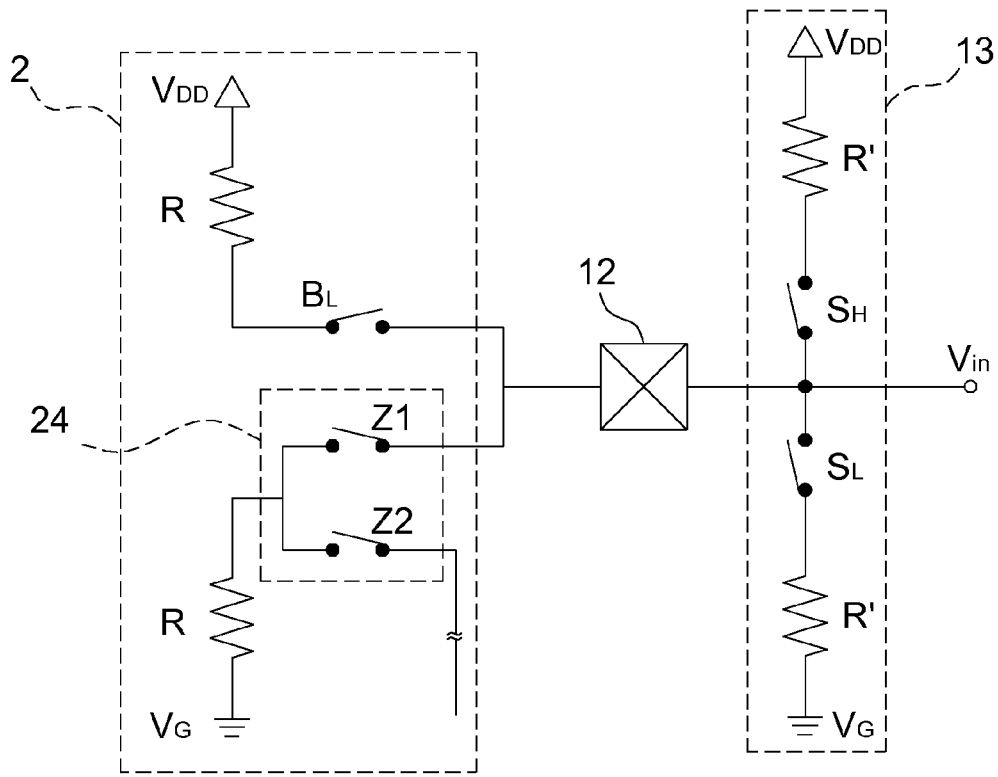
FIG. 5A shows another circuit diagram of the external circuitry and the internal circuitry of the mouse device according to the second embodiment of the present disclosure.
FIGS. 5B and 5C show operational schematic diagrams of the mouse device shown in FIG. 5A.

Please refer to FIGS. 5A to 5B, FIG. 5A shows another circuit diagram of the external circuitry 2 and the internal circuitry 13 of the mouse device according to the second embodiment of the present disclosure, and FIG. 5B shows an operational schematic diagram of the mouse device shown in FIG. 5A.

The external circuitry 2 includes a switching component $B_L$, a mouse encoder 24 and two first resistors R having identical resistances. The switching component $B_L$ may be controlled by a left key of the mouse device. The mouse encoder 24 includes a first switch Z1 and a second switch Z2. When a mouse roller is rolled forward or backward, the first switch Z1 and the second switch Z2 may operate to form different combinations; for example, in a sequence of (ON, ON), (ON, OFF), (OFF, ON) and (OFF, OFF) for forward but in a reverse sequence for backward. For example, when the mouse left key is pressed, the switching component $B_L$ conducts to couple the multiplexing pin 12 to a voltage source $V_{DD}$ via one of the first resistors R; when the first switch Z1 conducts, the multiplexing pin 12 is coupled to a ground voltage $V_G$ via the other one of the first resistors R; in addition, when both the switching components $B_L$ and the first switch Z1 are not turned on, the multiplexing pin 12 is floating. In this embodiment, the second switch Z2 of the mouse encoder 24 is coupled to another multiplexing pin (not shown herein) of the control chip 10. That is, the voltage value Vin on the multiplexing pin 12 only reflects operating states of the switching component $B_L$ and the first switch Z1.

The internal circuitry 13 includes a first control switch $S_H$, a second control switch $S_L$ and two second resistors R' having identical resistances. The control chip 10 controls the ON/OFF of the control switches $S_H$ and $S_L$ within a detection interval (e.g. a time interval in which the mouse device is not capturing images) in a sequential of, e.g. $(S_H,S_L)$=(OFF,ON), (ON, OFF) and (OFF,OFF). When the first control switch $S_H$ conducts, the multiplexing pin 12 is coupled to the voltage source $V_{DD}$ via one of the two second resistors R'; and when the second control switch $S_L$ conducts, the multiplexing pin 12 is coupled to the ground voltage $V_G$ via the other one of the second resistors R'. In one embodiment, the resistance of the first resistors R is substantially equal to that of the second resistors R'. It should be mentioned that, in this embodiment the voltage source $V_{DD}$ and the ground voltage $V_G$ of the internal circuitry 13 are shown to be identical to those of the external circuitry 2, but they may be different from each other as shown in FIG. 4A. In addition, the switching component $B_L$ in FIG. 5A may also be replaced by a multiplexer as in FIG. 4C.

As shown in FIG. 5B, in order to increase the resolution of voltage identification and to improve the identification accuracy, in this embodiment three detection states are defined within one detection interval, including $(S_H,S_L)$=(OFF,ON), (ON,OFF) and (OFF, OFF), wherein the sequence of the three detection states does not have particular limitation. The voltage detection circuit 11 is able to detect one voltage value Vin in each detection state within one detection interval, and the control chip 10 may identify conducting states of the switching component $B_L$ and the first switch Z1 according to a combination of the voltage values Vin respectively detected in the three detection states. As shown in FIG. 5B, every voltage value Vin may be calculated using voltage division and it is assumed that the resistors R and R' have identical resistances herein. For example, in the first detection state (e.g. $S_L$ is ON), when the first switch Z1 is OFF and the switching component $B_L$ is ON, the voltage value on the multiplexing pin 12 can be obtained as Vin=$V_{DD} \times R'/(R+R')$; and if R=R', the voltage value can be obtained as Vin=$V_{DD}/2$. In addition, other voltage values Vin in FIG. 5B may be obtained according to the similar method and thus details thereof will not be repeated herein. In addition, one detection interval may only include two detection states, such as $(S_H,S_L)$=(ON,OFF) and (OFF, ON).

Figures 5C, 6A:
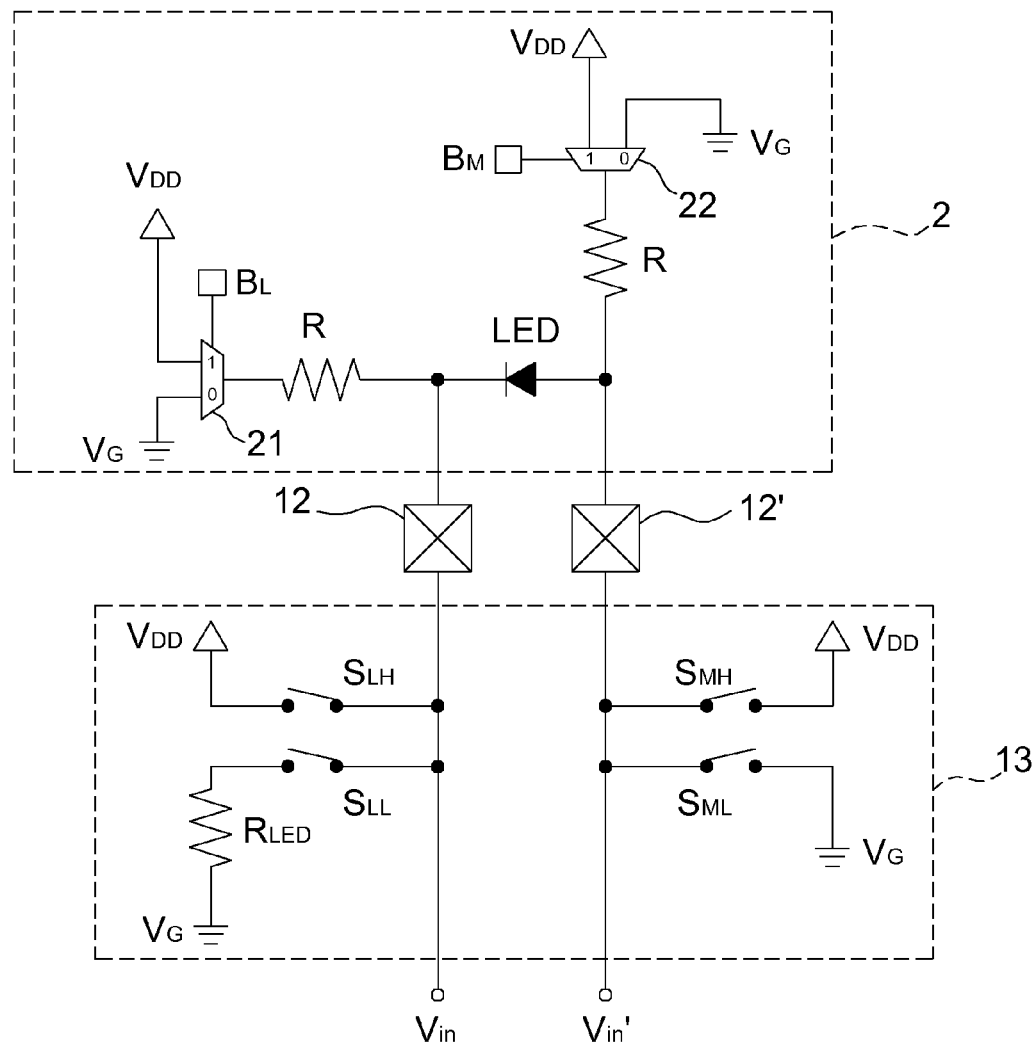
FIG. 6A shows another circuit diagram of the external circuitry and the internal circuitry of the mouse device according to the second embodiment of the present disclosure.

In addition, the present embodiment may further include a detection state associated with a sleep mode as shown in FIG. 5C. In the sleep mode, the second control switch $S_L$ is ON; and as long as the switching component $B_L$ is ON, the voltage value Vin on the multiplexing pin 12 is at least larger than $V_{DD}/3$ no matter what is the operating state of the first switch Z1. Therefore, the sleep mode may be ended when the voltage detection circuit 11 detects that the voltage value Vin is larger than $V_{DD}/3$, wherein the definition of a sleep mode is well known and thus details thereof will not be repeated herein.

In this embodiment, the control chip 10 may identify operating states of a mouse key and a switch of a mouse encoder according to a voltage value Vin detected by the voltage detection circuit 11.

Figures 6B, 6C:
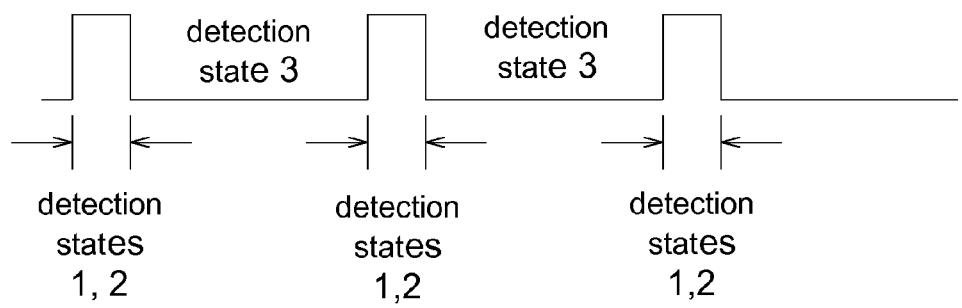
FIGS. 6B and 6C show operational schematic diagrams of the mouse device shown in FIG. 6A.

Please refer to FIGS. 6A to 6B, FIG. 6A shows another circuit diagram of the external circuitry 2 and the internal circuitry 13 of the mouse device according to the second embodiment of the present disclosure, and the voltage detection circuit 11 herein is configured to detect voltage values Vin and Vin' on two multiplexing pins 12 and 12'. The control chip 10 controls an operation of an electronic device coupled to the mouse device according to different combinations of the voltage values Vin and Vin' on the multiplexing pins 12 and 12'. FIG. 6B shows an operational schematic diagram of the mouse device shown in FIG. 6A.

The external circuitry 2 includes a first multiplexer 21, a second multiplexer 22, a light emitting diode (LED) and two resistors R having identical resistances. The first multiplexer 21 is under control of a control component (e.g. a mouse left key $B_L$) to conduct the logic input "1" or "0". For example, when the mouse left key $B_L$ is pressed, the multiplexing pin 12 is coupled to a voltage source $V_{DD}$ via one of the resistors R; and when the mouse left key $B_L$ is not pressed, the multiplexing pin 12 is coupled to a ground voltage $V_G$ via the same resistor R. The second multiplexer 22 is under control of a control component (e.g. a mouse middle key $B_M$) to conduct the logic input "1" or "0". For example, when the mouse middle key $B_M$ is pressed, the multiplexing pin 12' is coupled to the voltage source $V_{DD}$ via the second one of the resistors R; and when the mouse middle key $B_M$ is not pressed, the multiplexing pin 12' is coupled to the ground voltage $V_G$ via the second one of the resistors R. The LED is directly coupled to between the multiplexing pins 12 and 12', and a forward direction of the LED is not limited to that shown in FIG. 6A. It should be mentioned that said control components $B_L$ and $B_M$ are not limited to the mouse left key and the mouse middle key.

The internal circuitry 13 includes a first switch set $S_{LH}$, $S_{LL}$ and a second switch set $S_{MH}$, $S_{ML}$ which are controlled by the control chip 10 to form different detection states. The first switch set $S_{LH}$, $S_{LL}$ is configured to couple the multiplexing pin 12 to the voltage source $V_{DD}$ or the ground voltage $V_G$ according to different detection states thereof so as to output a voltage value Vin. The second switch set $S_{MH}$, $S_{ML}$ is configured to couple the multiplexing pin 12' to the voltage source $V_{DD}$ or the ground voltage $V_G$ according to different detection states thereof so as to output a voltage value Vin'. It should be mentioned that in this embodiment the voltage source $V_{DD}$ and the ground voltage $V_G$ in the internal circuitry 13 are shown to be identical to those in the external circuitry 2, but they may be different from each other as shown in FIG. 4A.

FIG. 6B shows four different detection states of this embodiment, wherein the first detection state and the second detection state are configured to detect operating states of mouse keys (e.g. the left key and the middle key herein); the third detection state is configured to control an operating state of the LED, which is served as a light source for the mouse device capturing images (image frames); and the fourth detection state is for the detection in the sleep mode. FIG. 6C shows detection intervals of different detection states, wherein since the detection of the mouse keys (i.e. the first and second detection states) needs very short time, these detection intervals may be designed in a time interval that the mouse device is not capturing images; the third detection state is designed to associated with the image capture intervals of the mouse device, and a start point of the third detection states is preferably earlier than or equal to that of the image capture intervals; and the fourth detection state is not shown in FIG. 6C as it is not triggered when the mouse device is outputting images normally. In addition, the internal circuitry 13 may further include a current limiting resistor $R_{LED}$ coupled to between the control switch $S_{LL}$ and the ground voltage $V_G$ configured to protect the LED. It is appreciated that when the forward direction of the LED is inversed, the current limiting resistor $R_{LED}$ should be coupled to between the controls witch $S_{ML}$ and the ground voltage $V_G$, and the operation of the control switches in the second detection state needs to be altered correspondingly.

In each detection state, the voltage values Vin and Vin' on the multiplexing pins 12 and 12' may also be obtained using voltage division. For example in the first detection state, the control switch $S_{ML}$ conducts such that the multiplexing pin 12' is grounded; the LED now is reverse-biased and thus does not emit light. The multiplexing pin 12 is coupled to voltage source $V_{DD}$ or the ground voltage $V_G$ to output the voltage value Vin according to the operating state of the control component $B_L$, and the control chip may identify the operating state of the control component $B_L$ according to the voltage value Vin. Similarly, the second detection state is configured to detect the operating state of the control component $B_M$. In the third detection state, the control switch $S_{MH}$ conducts and now the LED is ON or OFF according to the detection states of the first switch set $S_{LH}$, $S_{LL}$; for example, when the mouse device is capturing images, the LED is turned on to provide light for the image capturing. In the fourth detection state, the control switches $S_{ML}$ and $S_{LL}$ conduct such that the multiplexing pins 12 and 12' are grounded; when any one of the control components $B_M$ and $B_L$ is pressed, the voltage values Vin, Vin' on the multiplexing pins 12, 12' may substantially equal to $V_{DD}$ and thus it is able to identify that the sleep mode is ended.

In this embodiment, the control chip 10 may identify operating states of two mouse keys and one LED according to voltage values Vin and Vin' detected by the voltage detection circuit 11.

Some applications of the second embodiment of the present disclosure will be illustrated hereinafter.

Figure 7:
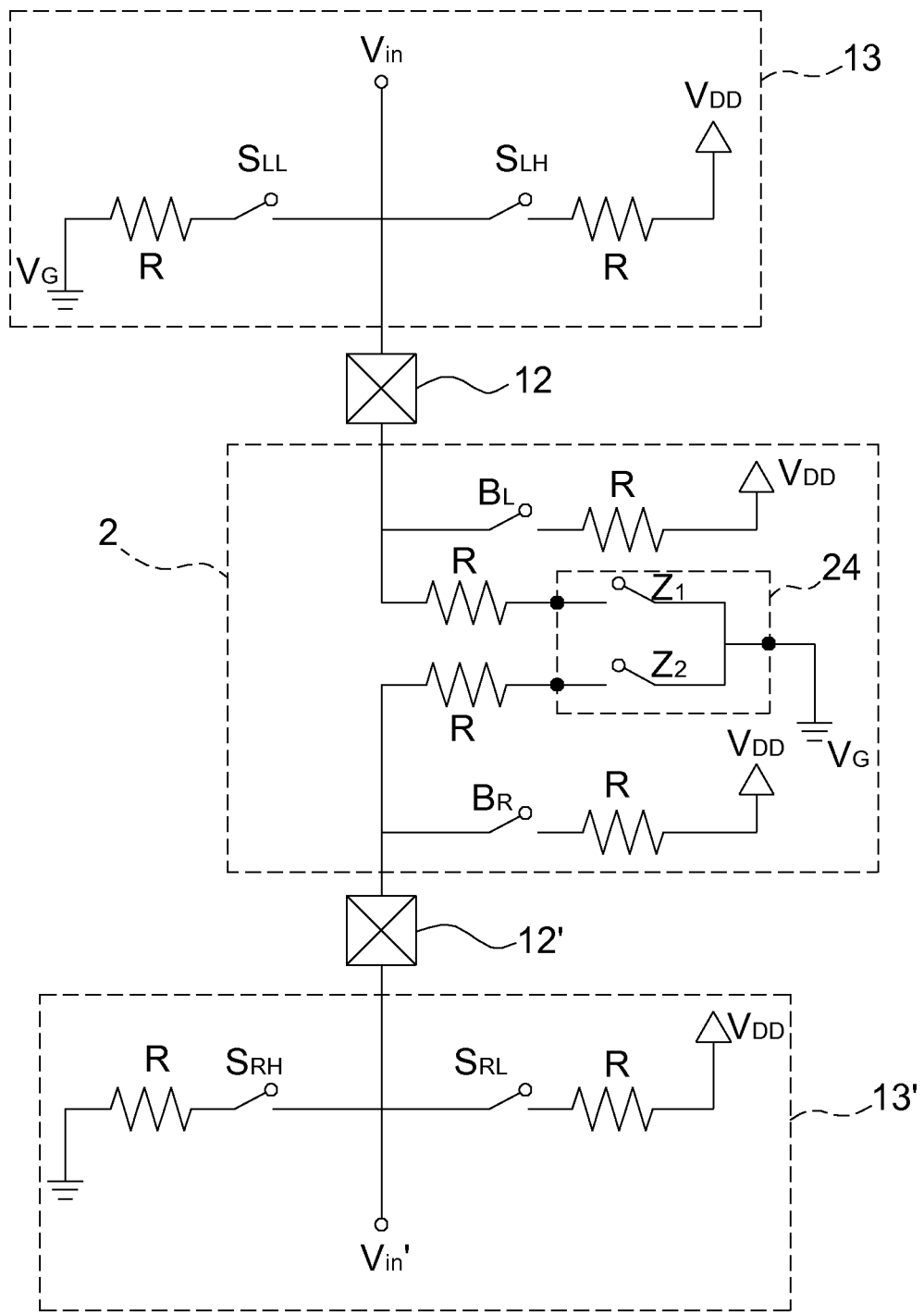
FIG. 7 shows a circuit diagram of an application of the mouse device according to the second embodiment of the present disclosure.

Please refer to FIG. 7, it shows a circuit diagram of an application of the mouse device according to the second embodiment of the present disclosure in which the control chip 10 may identify operating states of two mouse keys (e.g. $B_L$ and $B_R$) and a mouse encoder 24 according to voltage values Vin and Vin' on two multiplexing pins 12 and 12' detected by the voltage detection circuit 11, wherein the voltage value Vin on the multiplexing pin 12 reflects operating states of the control component $B_L$ and a first switch Z1 of the mouse encoder 24, and the voltage value Vin' on the multiplexing pin 12' reflects operating states of the control component $B_R$ and a second switch Z2 of the mouse encoder 24. In other words, the control chip 10 detects the operating states of the control component $B_L$ and the first switch Z1 and the operating states of the control component $B_R$ and the second switch Z2 separately, and the detection method of this application are similar to those illustrated in FIGS. 5A and 5B and corresponding illustrations and thus details thereof will not be repeated herein.

Please refer to FIGS. 8A to 8B, FIG. 8A shows another circuit diagram of the external circuitry 2 and the internal circuitry 13 of another application of the mouse device according to the second embodiment of the present disclosure, and herein the voltage detection circuit 11 is configured to detect voltage values Vin, Vin' and Vin" on three multiplexing pins 12, 12' and 12". The control chip 10 controls an operation of an electronic device coupled to the mouse device according to different combinations of the voltage values Vin, Vin' and Vin" on the multiplexing pins 12, 12' and 12". FIG. 8B shows an operational schematic diagram of the mouse device shown in FIG. 8A.

The external circuitry 2 includes a first multiplexer 21, a second multiplexer 22, a third multiplexer 23, a light emitting diode LED1, a light emitting diode LED2 and three resistors R having identical resistances. The first multiplexer 21 is under control of a control component (e.g. a mouse left key $B_L$) to conduct the logic input "1" or "0"; for example, when the mouse left key $B_L$ is pressed, the multiplexing pin 12 is coupled to a voltage source $V_{DD}$ via one of the resistors R, and when the mouse left key $B_L$ is not pressed, the multiplexing pin 12 is coupled to a ground voltage $V_G$ via the same resistor R. Similarly, the second multiplexer 22 is under control of a control component (e.g. a mouse middle key $B_M$) to conduct the logic input "1" or "0", and the third multiplexer 23 is under control of a control component (e.g. a mouse right key $B_R$) to conduct the logic input "1" or "0". The LED1 is directly coupled to between the multiplexing pins 12 and 12', and the LED2 is directly coupled to between the multiplexing pins 12' and 12". Forward directions of the LED1 and LED2 are not limited to those shown in FIG. 8A. It should be mentioned that, said control components $B_L$, $B_M$ and $B_R$ are not limited to the mouse left key, middle key and right key. In this embodiment, the LED1 may be served as a light source for the mouse device capturing images, and the LED2 may be served as a light source for an optical encoder of a mouse roller, but not limited thereto.

The internal circuitry 13 includes a first switch set $S_{LH}$, $S_{LL}$, a second switch set $S_{MH}$, $S_{ML}$ and a third switch set $S_{RH}$, $S_{RL}$, and these switch sets are controlled by the control chip 10 to form different detection states. The first switch set $S_{LH}$, $S_{LL}$ couples the multiplexing pin 12 to a voltage source $V_{DD}$ or a ground voltage $V_G$ according to different detection states so as to output a voltage value Vin; the second switch set $S_{MH}$, $S_{ML}$ couples the multiplexing pin 12' to the voltage source $V_{DD}$ or the ground voltage $V_G$ according to different detection states so as to output a voltage value Vin'; and the third switch set $S_{RH}$, $S_{RL}$, couples the multiplexing pin 12" to the voltage source $V_{DD}$ or the ground voltage $V_G$ according to different detection states so as to output a voltage value Vin". It should be mentioned that, in this embodiment the voltage source $V_{DD}$ and the ground voltage $V_G$ in the internal circuitry 13 are shown to be identical to those in the external circuitry 2, but they may be different from each other as in FIG. 4A.

FIG. 8B shows four different detection states in this embodiment, wherein the first detection state and the second detection state are configured to detect operating states of mouse keys; the third detection state is configured to control operating states of the LED1 and LED2; and the fourth detection state is for the detection in the sleep mode. In addition, detection intervals of this application may be similar to those shown in FIG. 6C but have the difference that the voltage detection circuit 11 has to detect one more voltage value (e.g. Vin") within each detection interval or the control chips 10 needs to control the ON/OFF of one more control switch set (e.g. the third switch set $S_{RH}$, $S_{RL}$), and thus details thereof will not be repeated herein. In addition, the internal circuitry 13 may further include a current limiting resistor $R_{LED1}$ coupled to between the control switch $S_{LL}$ and the ground voltage $V_G$ in order to protect the LED1 and a current limiting resistor $R_{LED2}$ coupled to between the control switch $S_{RL}$ and the ground voltage $V_G$ in order to protect the LED2.

In each detection state, the voltage values Vin, Vin' and Vin" on the multiplexing pins 12, 12' and 12" may also be obtained using voltage division. For example in the first detection state, the control switch $S_{ML}$ conducts such that the multiplexing pin 12' is grounded; now the LED1 and LED2 are reverse-biased and the multiplexing pin 12 is coupled to the voltage source $V_{DD}$ or the ground voltage $V_G$ to output the voltage value Vin according to the operating state of the control component $B_L$, and the multiplexing pin 12" is coupled to the voltage source $V_{DD}$ or the ground voltage $V_G$ to output the voltage value Vin" according the operating state of the control component $B_R$; and the control chip 10 may identify the operating states of the control components $B_L$, $B_R$ according to the voltage values Vin, Vin'. Similarly, the second detection state is configured to detect the operating state of the control component $B_M$; now the control switches $S_{LH}$, $S_{RH}$ are turned on to reverse-bias the LED1 and LED2. In the third detection state, the control switch $S_{MH}$ conducts; now the LED1 is turned on or off according to the detection state of the first switch set $S_{LH}$, $S_{LL}$, and the LED2 is turned ON or OFF according to the detection state of the third switch set $S_{RH}$, $S_{RL}$. In the fourth detection state, the control switches $S_{RL}$, $S_{ML}$ and $S_{LL}$ conduct such that the multiplexing pins 12, 12' and 12" are grounded. When any one of the control components $B_M$, $B_L$ or $B_R$ is pressed, the voltage values Vin, Vin' and Vin" on the multiplexing pins 12, 12' and 12" will be substantially equal to $V_{DD}$ such that the sleep mode is identified to be ended. In another embodiment, it is able to define another detection state when the control switches $S_{RL}$, $S_{ML}$ and $S_{LL}$ are turned on but the control switches $S_{RH}$, $S_{MH}$ and $S_{LH}$ are turned off (i.e. both the LED1 and LED2 are OFF).

In this embodiment, the control chip 10 may identify operating states of three mouse keys and two light emitting diodes according to voltage values Vin, Vin' and Vin" detected by the voltage detection circuit 11. It is appreciated that FIG. 8A is an extended application of FIG. 6A, and it is able to increase the number of mouse keys and light emitting diodes using similar method.

Figure 8C:
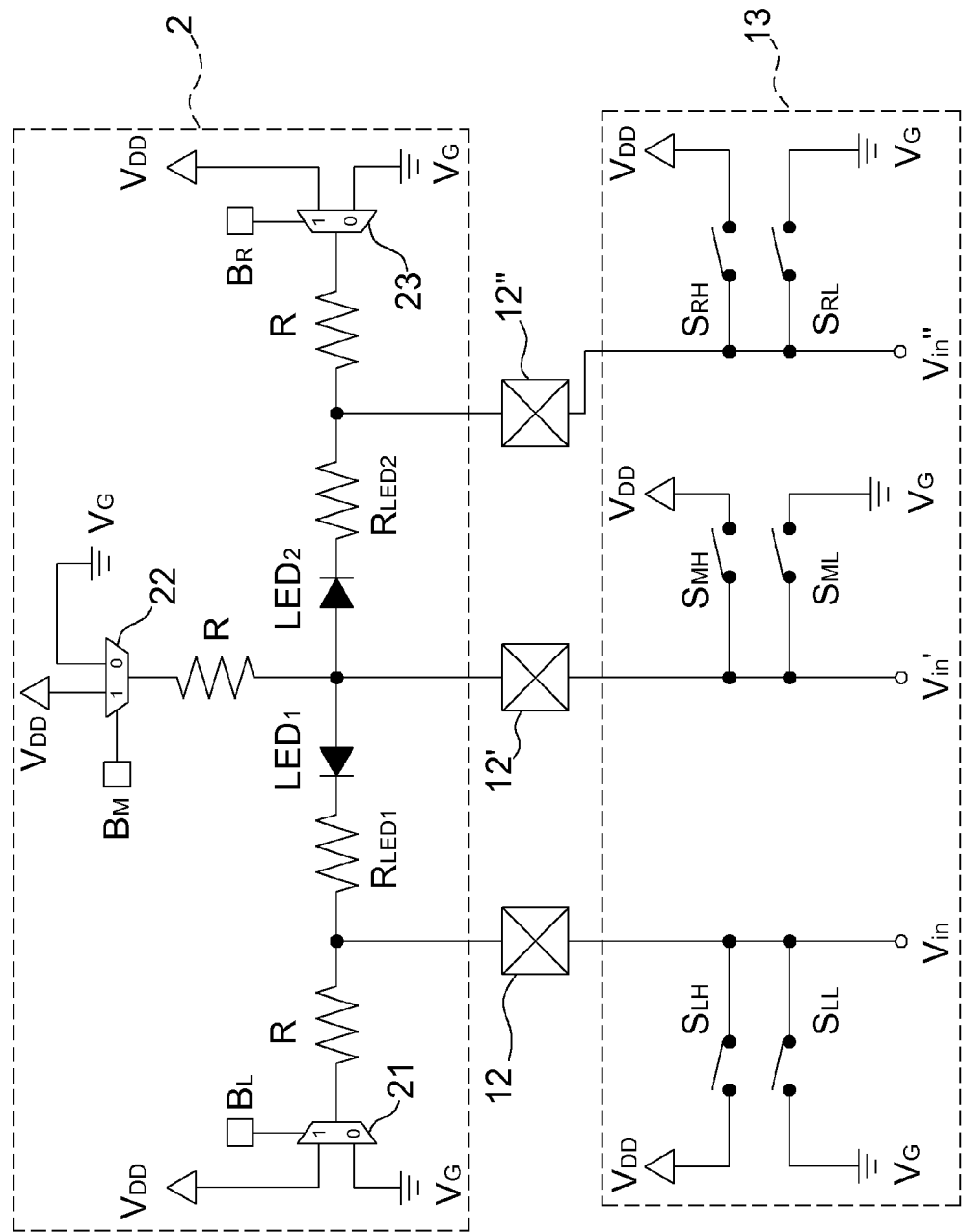
FIG. 8C shows another circuit diagram of the mouse device in FIG. 8A.

Please refer to FIG. 8C, it shows another circuit diagram of the external circuitry 2 and the internal circuitry 13 of the mouse device according to the second embodiment of the present disclosure. The difference of this embodiment and FIG. 8A is that in this embodiment the two resistors $R_{LED1}$ and $R_{LED2}$ are included in the external circuitry 2 rather than the internal circuitry 13 i.e. the current limiting resistor is preferably disposed in the internal circuitry 13 or the external circuitry 2 associated with a conducting path of the LED. The merit of disposing the resistors $R_{LED}$ outside the control chip 10 is that more accurate commercially available resistors may be used such that the resistors $R_{LED1}$ and $R_{LED2}$ do not need to be incorporated in the circuit of the control chip 10. In addition, the disposition and the operation of other components are similar to those in FIG. 8A and thus details thereof will not be repeated herein.

As mentioned above, each pin of conventional mouse chips is used to detect the operating state of only one control component such that the pin number is higher to increase the system cost. The present disclosure further provides a mouse device (FIGS. 2 and 3) that may detect the voltage value on at least one multiplexing pin with a voltage detection circuit so as to identify the operating state of at least one control component thereby reducing the pin number and the manufacturing cost and maintaining enough operating functions.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:
1. A mouse device, comprising:
   a control chip comprising:
      at least one multiplexing pin;
      an internal circuitry comprising a power source and a ground selectively coupled to the at least one multiplexing pin, the internal circuitry configured to output a plurality of voltage values within a detection interval; and
      a voltage detection circuit configured to detect the voltage values; and an external circuitry comprising a plurality of power sources, a plurality of resistors and a plurality of control components, the external circuitry coupled to the at least one multiplexing pin, wherein the control chip is configured to control different detection states of the internal circuitry within the detection interval to allow the voltage detection circuit to detect a set of voltage values on a same multiplexing pin within the detection interval, and identify operating states of the plurality of control components of the external circuitry together according to the set of voltage values detected on the same multiplexing pin in the different detection states, wherein different operating states of the control components form different connections of the power sources and the resistors in the external circuitry, and the different detection states of the internal circuitry form different connections of the power source and the ground in the internal circuitry to the same multiplexing pin, thereby generating the set of voltage values on the same multiplexing pin at the different detection states due to the different connections of the power source and the ground in the internal circuitry to the same multiplexing pin and the different connections of the power sources and the resistors in the external circuitry to the same multiplexing pin according to voltage division of the resistors.

2. The mouse device as claimed in claim 1, wherein the control components are mouse keys, mouse encoders or a combination thereof.

3. The mouse device as claimed in claim 1, wherein the external circuitry comprises a first control component, a second control component and two first resistors having identical resistances; and the same multiplexing pin is coupled to at least one of a first voltage source and a second voltage source via one of the resistors or is floating according to the operating states of the first control component and the second control component.

4. The mouse device as claimed in claim 3, wherein one of the first control component and the second control component is a mouse key and the other is a switch of a mouse encoder or a further mouse key; and the same multiplexing pin is coupled to at least one of the first voltage source and the second voltage via one of the resistors when at least one of the first control component and the second control component conducts.

5. The mouse device as claimed in claim 3, wherein the first control component further comprises a first multiplexer and a first mouse key, and the same multiplexing pin is coupled to the first voltage source via the first multiplexer or is floating according to a pressing state of the first mouse key; and the second control component further comprises a second multiplexer and a second mouse key, and the same multiplexing pin is coupled to the second voltage source via the second multiplexer or is floating according a pressing state of the second mouse key.

6. The mouse device as claimed in claim 3, wherein the internal circuitry comprises a first control switch, a second control switch and two second resistors having identical resistances; and the control chip is configured to control the detection states of the internal circuitry to couple the same multiplexing pin to a third voltage source via one of the second resistors and the first control switch or to a fourth voltage source via the other one of the second resistors and the second control switch.

7. The mouse device as claimed in claim 6, wherein the first control switch and the second control switch are CMOS switches;

the first voltage source is equal to the third voltage source; and the second voltage source and the fourth voltage source are equal to a ground voltage.

8. The mouse device as claimed in claim 1, wherein the at least one multiplexing pin of the control chip comprises a first multiplexing pin and a second multiplexing pin, and the external circuitry comprises a first multiplexer coupled to the first multiplexing pin and a second multiplexer coupled to the second multiplexing pin;

the voltage detection circuit is configured to detect a voltage value on the first multiplexing pin to identify an operating state of the first multiplexer when the second multiplexing pin is grounded via the internal circuitry; and the voltage detection circuit is configured to detect a voltage value on the second multiplexing pin to identify an operating state of the second multiplexer when the first multiplexing pin is grounded via the internal circuitry.

9. The mouse device as claimed in claim 8, wherein the internal circuitry comprises a first switch set and a second switch set;

the control chip is configured to control detection states of the first switch set to couple the first multiplexing pin to a third voltage source or a ground voltage; and the control chip is configured to control detection states of the second switch set to couple the second multiplexing pin to the third voltage source or the ground voltage.

10. The mouse device as claimed in claim 8, wherein the external circuitry comprises the first multiplexer, the second multiplexer, a first LED and two first resistors having identical resistances, and the first LED is coupled to between the first multiplexing pin and the second multiplexing pin;

the first multiplexer is under control of one of the control components to couple the first multiplexing pin to a first voltage source or a second voltage source via one of the first resistors; and the second multiplexer is under control of another one of the control components to couple the second multiplexing pin to the first voltage source or the second voltage via a second one of the first resistors.

11. The mouse device as claimed in claim 10, wherein the at least one multiplexing pin of the control chip further comprises a third multiplexing pin, and the external circuitry comprises the first multiplexer, the second multiplexer, a third multiplexer, the first LED, a second LED and three first resistors having identical resistances;

the second LED is coupled between the second multiplexing pin and the third multiplexing pin; and the third multiplexer is under control of another one of the control components to couple the third multiplexing pin to the first voltage source or the second voltage source via a third one of the first resistors.

12. The mouse device as claimed in claim 11, wherein the first LED is configured as a light source for the mouse device capturing images, and the second LED is configured as a light source for an optical encoder of the mouse device.

13. The mouse device as claimed in claim 1, wherein the voltage detection circuit is a comparator or an analog-to-digital converter.

14. A mouse device, comprising:
- a control chip comprising:
  - a plurality of multiplexing pins;
  - an internal circuitry comprising a power source and a ground selectively coupled to the multiplexing pins, the internal circuitry configured to output a plurality of voltage values within a detection interval; and
  - a voltage detection circuit configured to detect the voltage values; and
- an external circuitry coupled to the multiplexing pins and comprising a plurality of power sources, a plurality of resistors, a plurality of control components and at least one LED coupled between two of the multiplexing pins, and each of the control components being associated with one of the multiplexing pins, wherein the control chip is configured to
- control different detection states of the internal circuitry within the detection interval to allow the voltage detection circuit to detect a set of voltage values on a same multiplexing pin within the detection interval such that each of the multiplexing pins is detected with different sets of voltage values, and
- identify operating states of the plurality of control components together according to the sets of voltage values on the multiplexing pins detected in the different detection states and to control an operating state of the at least one LED, wherein
- different operating states of the control components form different connections of the power sources and the resistors in the external circuitry, and
- the different detection states of the internal circuitry form different connections of the power source and the ground in the internal circuitry to the same multiplexing pin, thereby generating the set of voltage values on the same multiplexing pin at different detection states due to
  - the different connections of the power source and the ground in the internal circuitry to the same multiplexing pin and
  - the different connections of the power sources and the resistors in the external circuitry to the same multiplexing pin according to voltage division of the resistors.

15. The mouse device as claimed in claim 14, wherein the control components are mouse keys, mouse encoders or a combination thereof.

16. The mouse device as claimed in claim 14, wherein the voltage detection circuit is a comparator or an analog-to-digital converter.

17. The mouse device as claimed in claim 14, further comprising a current limiting resistor disposed, associated with a conducting path of the LED, in the internal circuitry or the external circuitry.

18. The mouse device as claimed in claim 14, wherein the internal circuitry comprises a plurality of control switches respectively associated with the multiplexing pins.

* * * * *